Figure 1:
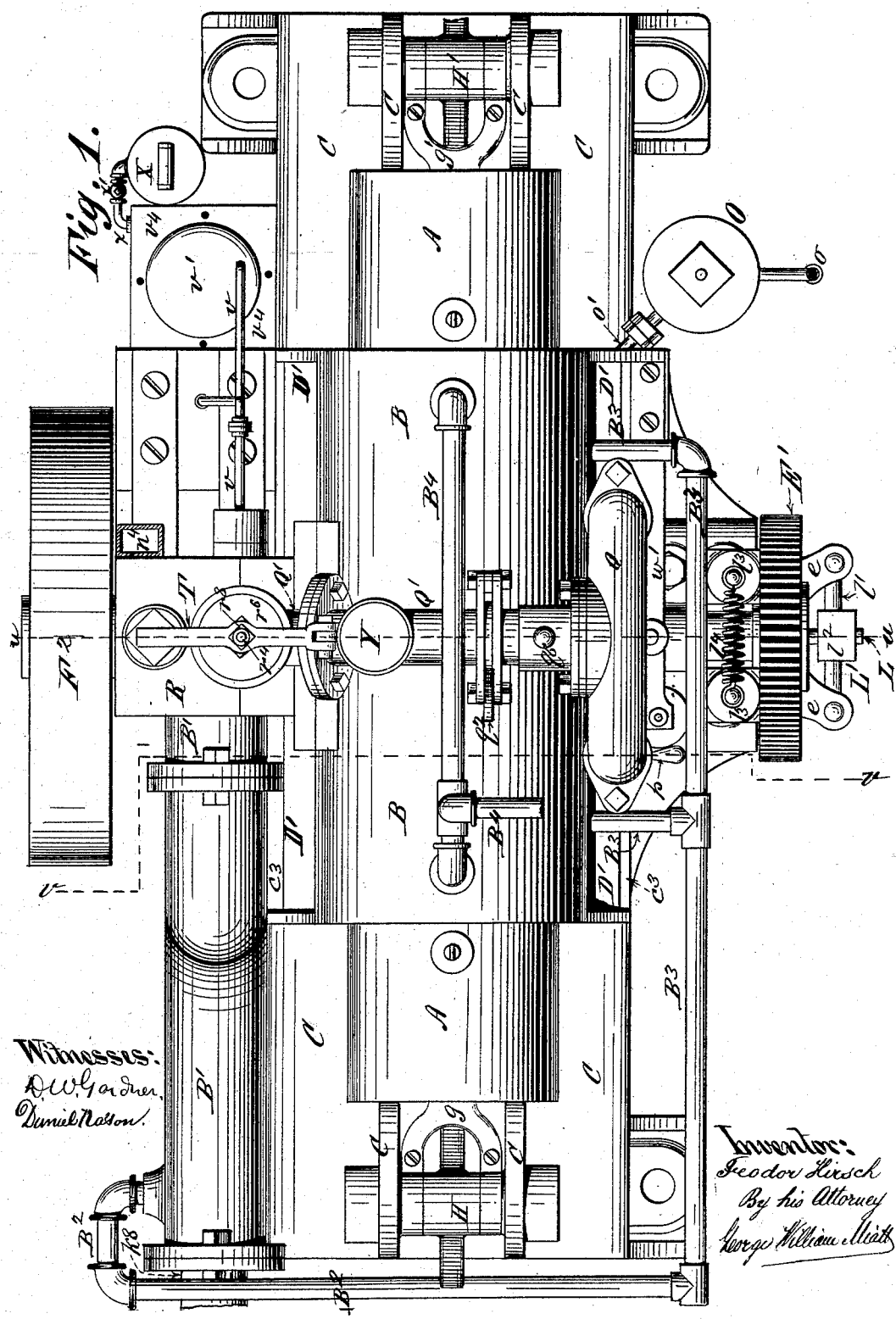

(No Model.) 11 Sheets—Sheet 1.

F. HIRSCH.
GAS ENGINE.

No. 522,712. Patented July 10, 1894.

(No Model.) 11 Sheets—Sheet 6.

F. HIRSCH.
GAS ENGINE.

No. 522,712. Patented July 10, 1894.

Witnesses:
D. W. Gardner
Daniel Nason.

Inventor:
Feodor Hirsch
By his Attorney
George William Miatt (No Model.) 11 Sheets—Sheet 7.
F. HIRSCH.
GAS ENGINE.

No. 522,712. Patented July 10, 1894.

Witnesses:
O. W. Gardner
Daniel Nason

Inventor:
Feodor Hirsch
By his Attorney
George William Miatt

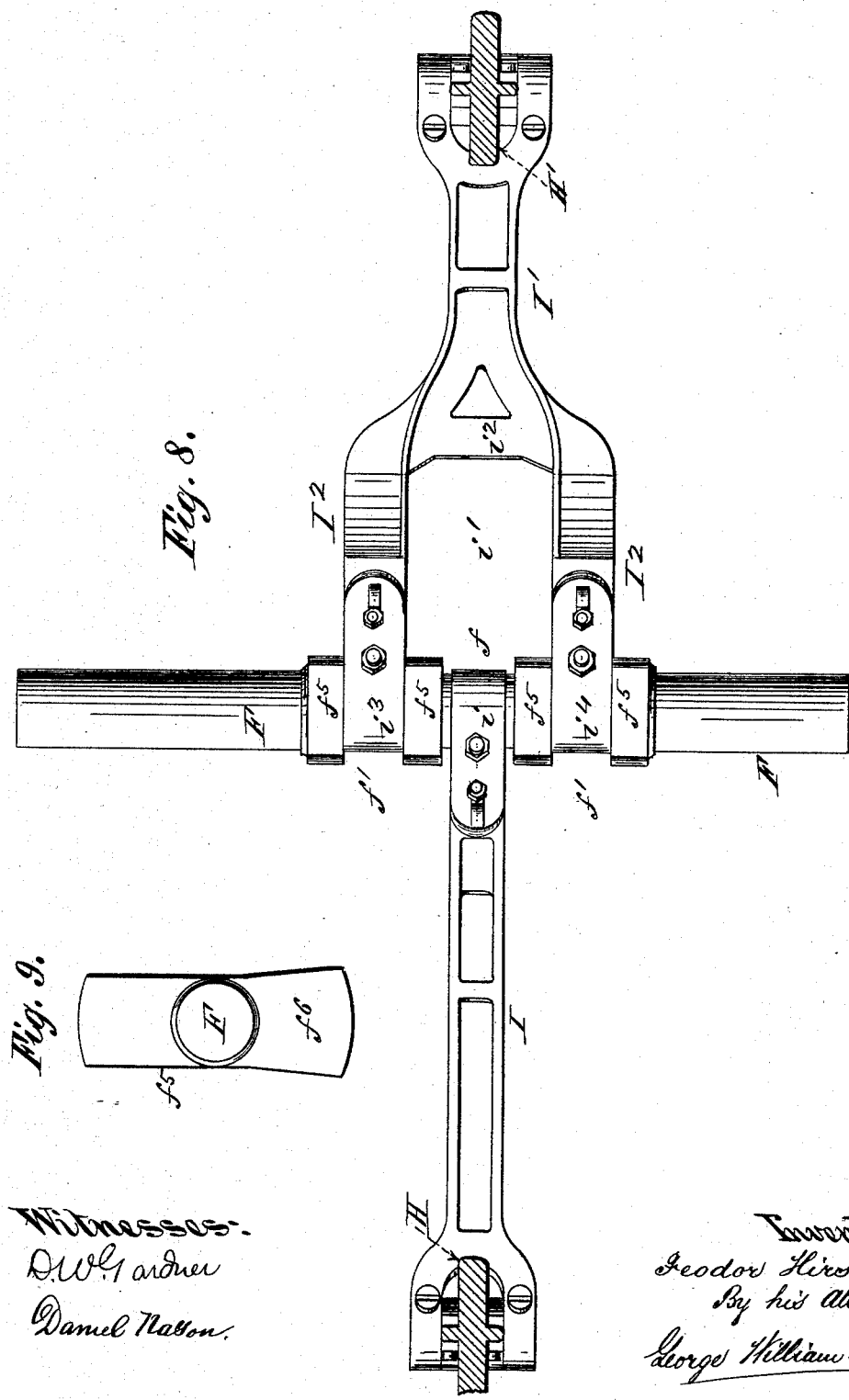

(No Model.)  F. HIRSCH.  11 Sheets—Sheet 9.
GAS ENGINE.
No. 522,712.  Patented July 10, 1894.
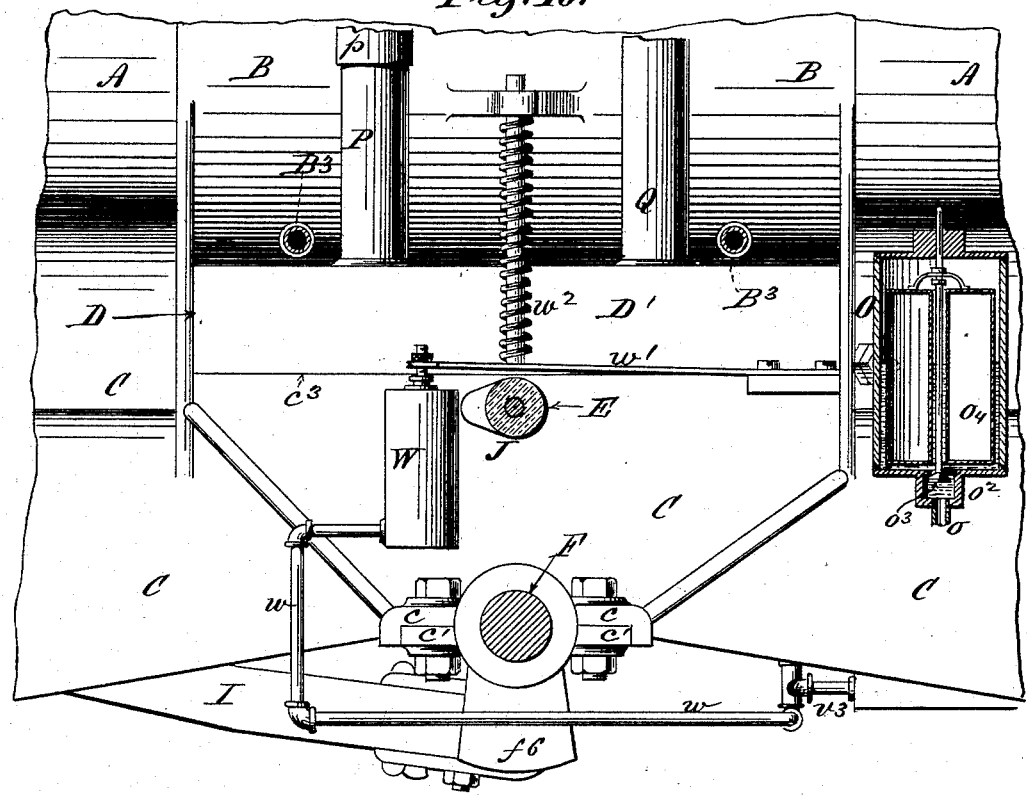
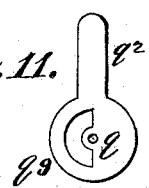
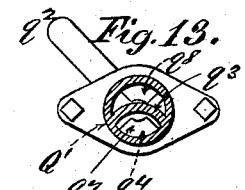
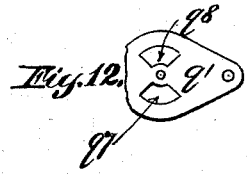
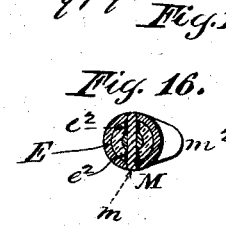
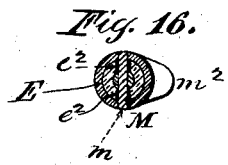
Witnesses:
D. W. Gardner,
Daniel Nason.
Inventor:
Feodor Hirsch
By his Attorney,
George William Miatt (No Model.)
F. HIRSCH.
GAS ENGINE.
No. 522,712. Patented July 10, 1894.
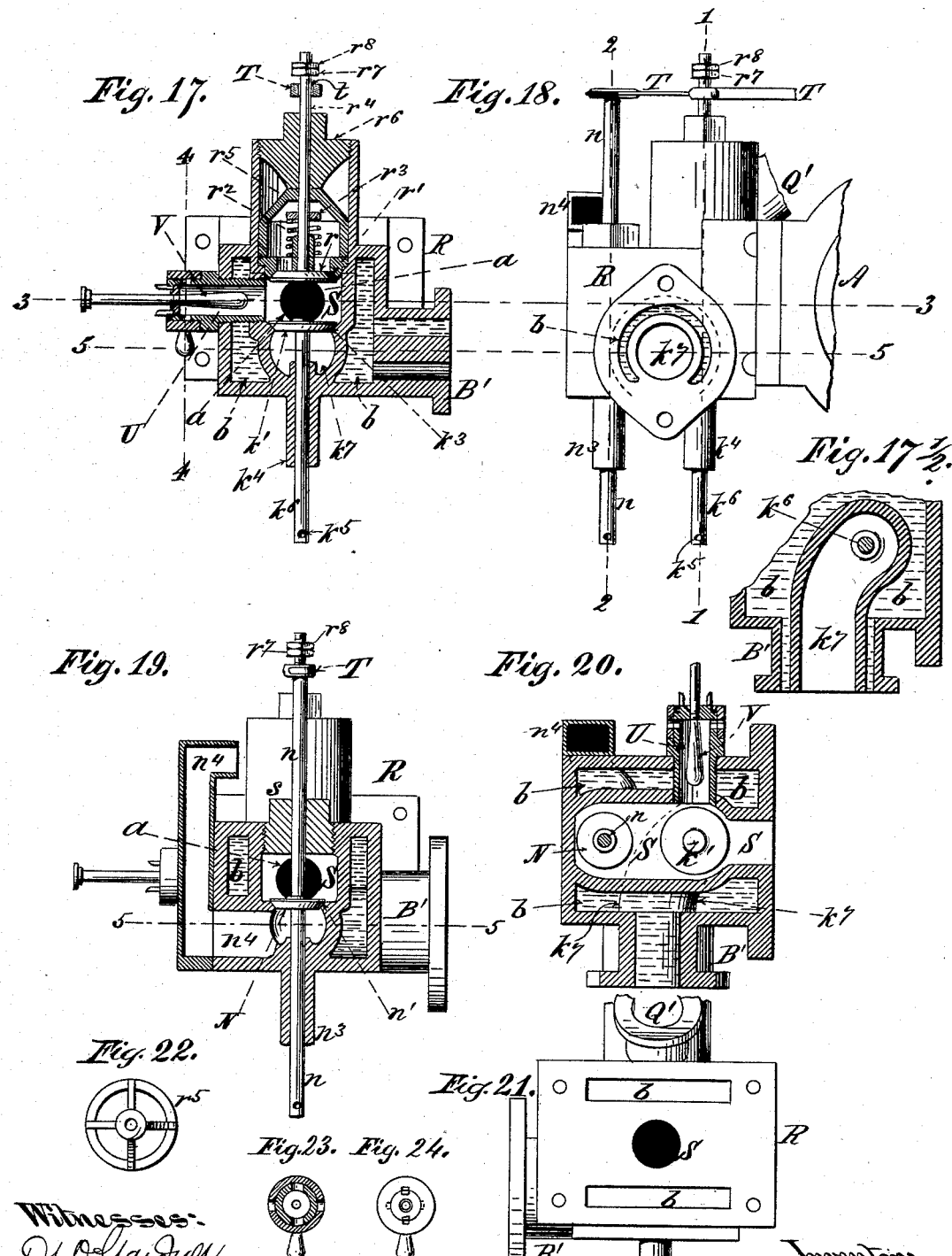

(No Model.) 11 Sheets—Sheet 11.

F. HIRSCH.
GAS ENGINE.

No. 522,712. Patented July 10, 1894.

Witnesses:
D. W. Gardner
Daniel Nason

Inventor:
Feodor Hirsch
By his Attorney,
George William Miatt

UNITED STATES PATENT OFFICE.

FEODOR HIRSCH, OF STEINWAY, NEW YORK.

GAS-ENGINE.

SPECIFICATION forming part of Letters Patent No. 522,712, dated July 10, 1894.

Application filed September 6, 1893. Serial No. 484,930. (No model.)

*To all whom it may concern:*

Be it known that I, FEODOR HIRSCH, a citizen of the United States, residing at Steinway, in the county of Queens and State of New York, have invented certain new and useful Improvements in Gas-Engines, of which the following is a description sufficient to enable others skilled in the art to which the invention appertains to make and use the same.

The main objects of my invention are avoidance of concussion and vibration and the utilization of the power ordinarily wasted by such concussion; the production of a more powerful engine for a given size and weight; simplification in the construction and arrangement of parts; a perfectly balanced engine; improved means for automatically governing the speed of the same; and improved means for supplying the engine with gas when a carburetor is used.

A distinguishing feature of my invention consists in the special construction of a gas engine having a duplex open-ended power cylinder with a central gas and firing port, two trunk pistons in said cylinder pivotally connected by rods directly to the ends of two rock levers, the opposite ends of said rock levers being connected by pitmen directly to radially opposed cranks upon a common power shaft,—all the parts being arranged in a common central plane of action coincident with that of the longitudinal axis of the power cylinder, so that the force of the explosion of gas between the two cylinders is counterbalanced and equally distributed and transmitted to the cranks on the power shaft.

Constructed according to my invention an engine may be made much more compact as a whole and is especially adapted for use as a motor for boats, vehicles, &c., and for household purposes. Owing to the perfect balance obtained in and between the operative parts it is practically free from vibration, so that it may be employed industrially or otherwise without the provision of a special foundation, without fear of imparting a jarring or trembling motion to the structure.

In the accompanying drawings I illustrate the practical embodiment of my invention in a gas engine in which a carburetor is used, although I do not confine myself to the use of a carburetor, since any source of gas supply may be rendered available; neither do I limit myself to the identical form and structure of parts shown since it is obvious that variations may be made in detail without departing from the spirit and intent of my invention.

Figure 2:
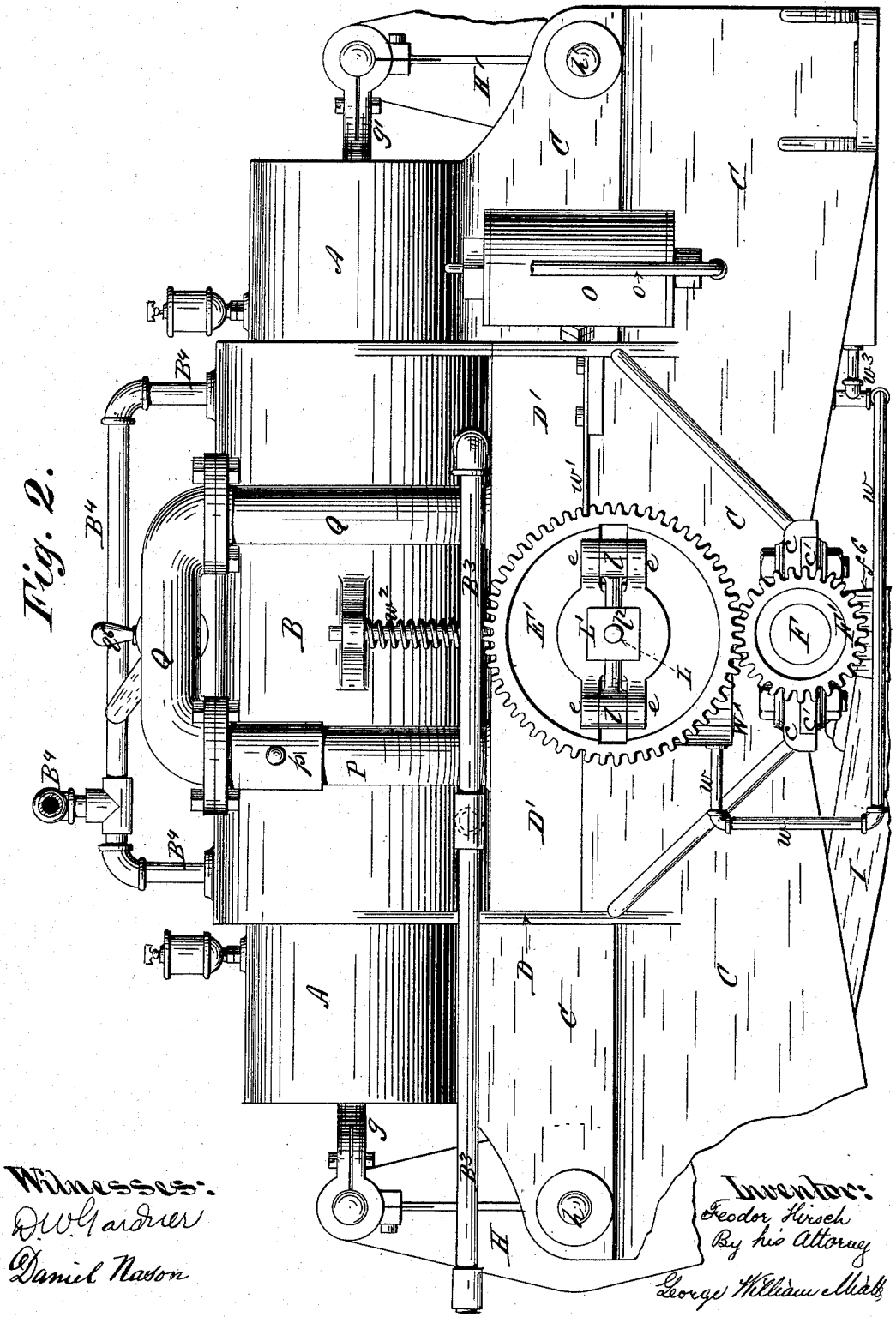
Figure 3:
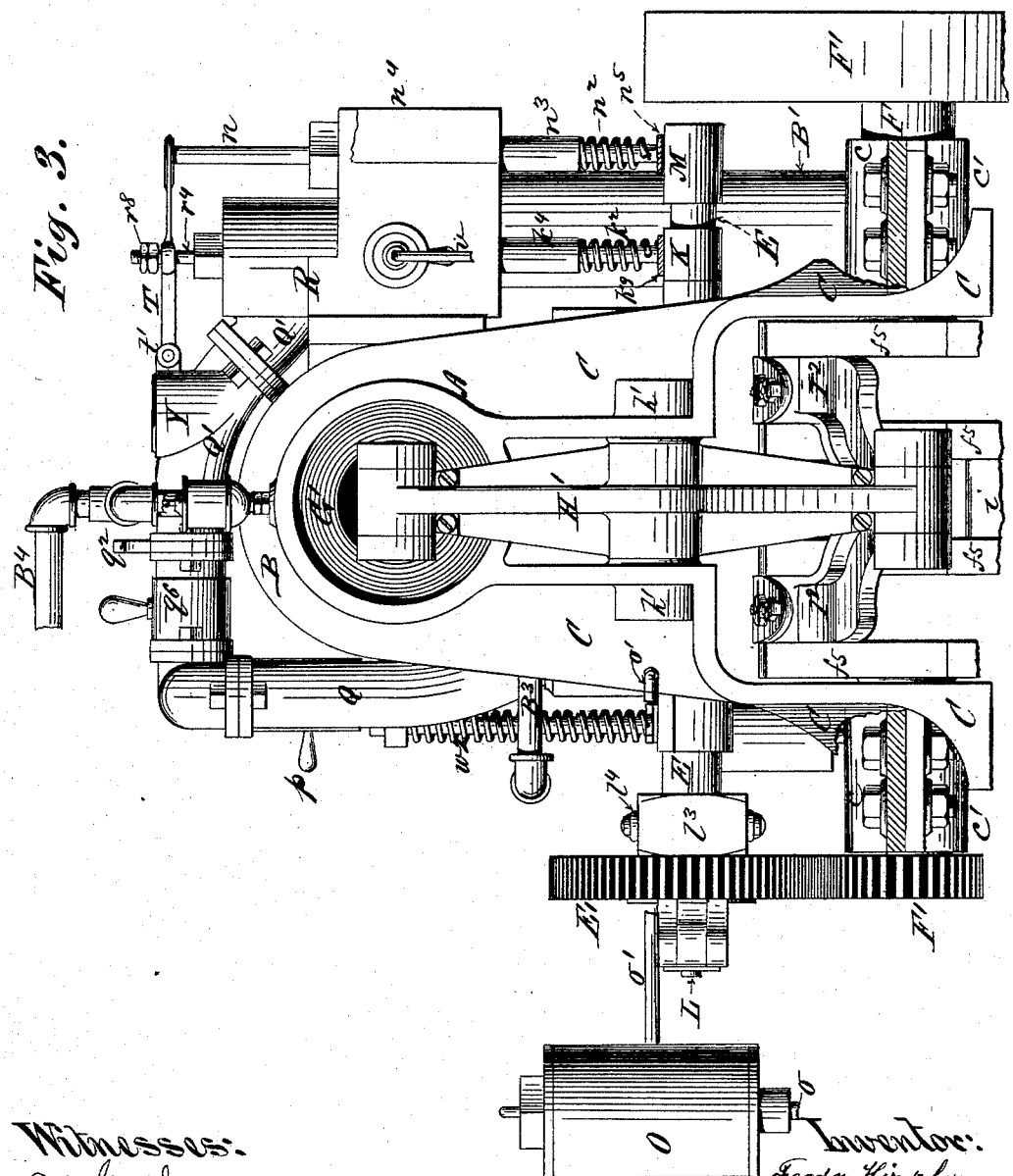
Figure 4:
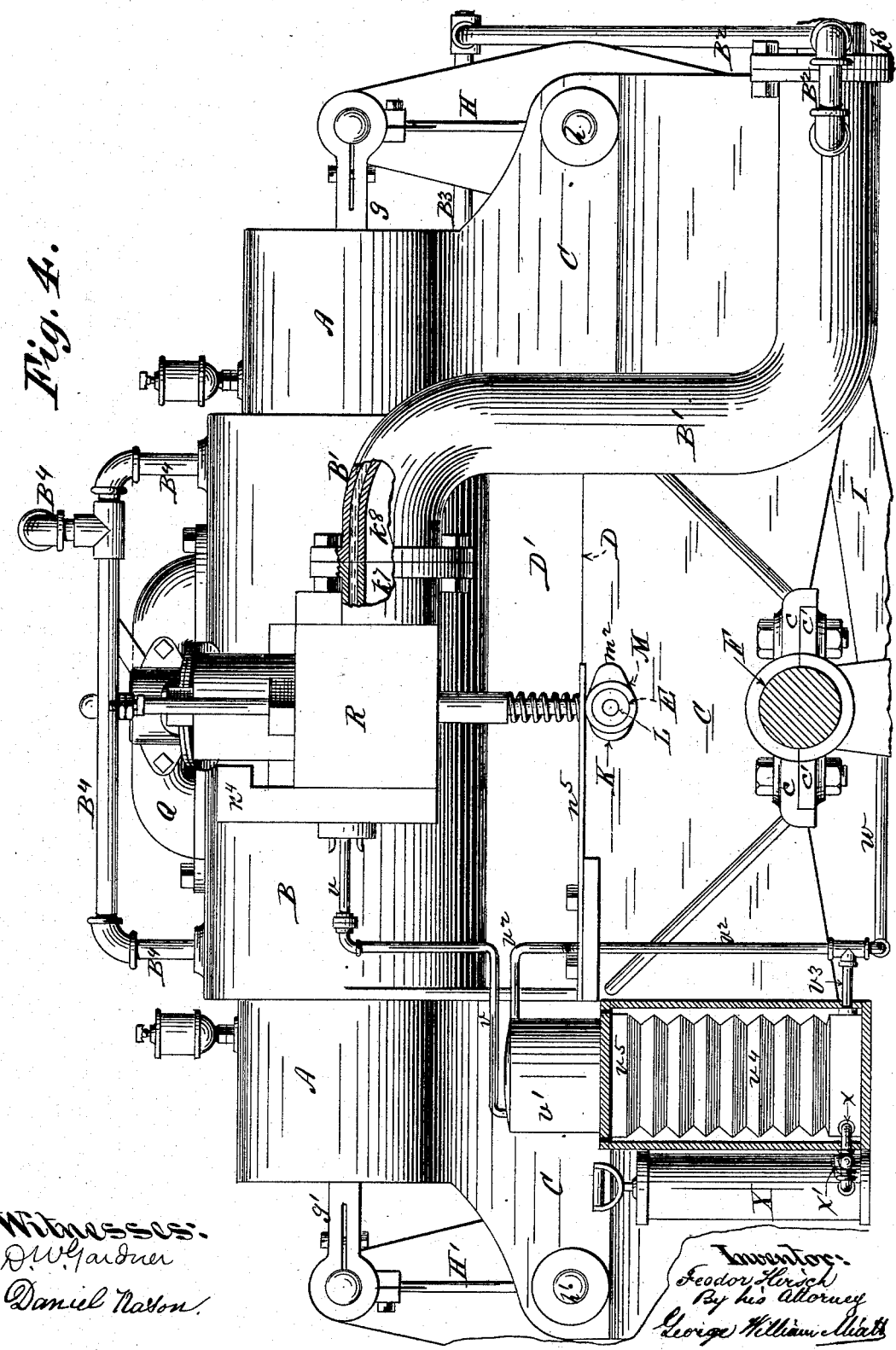
Figure 5:
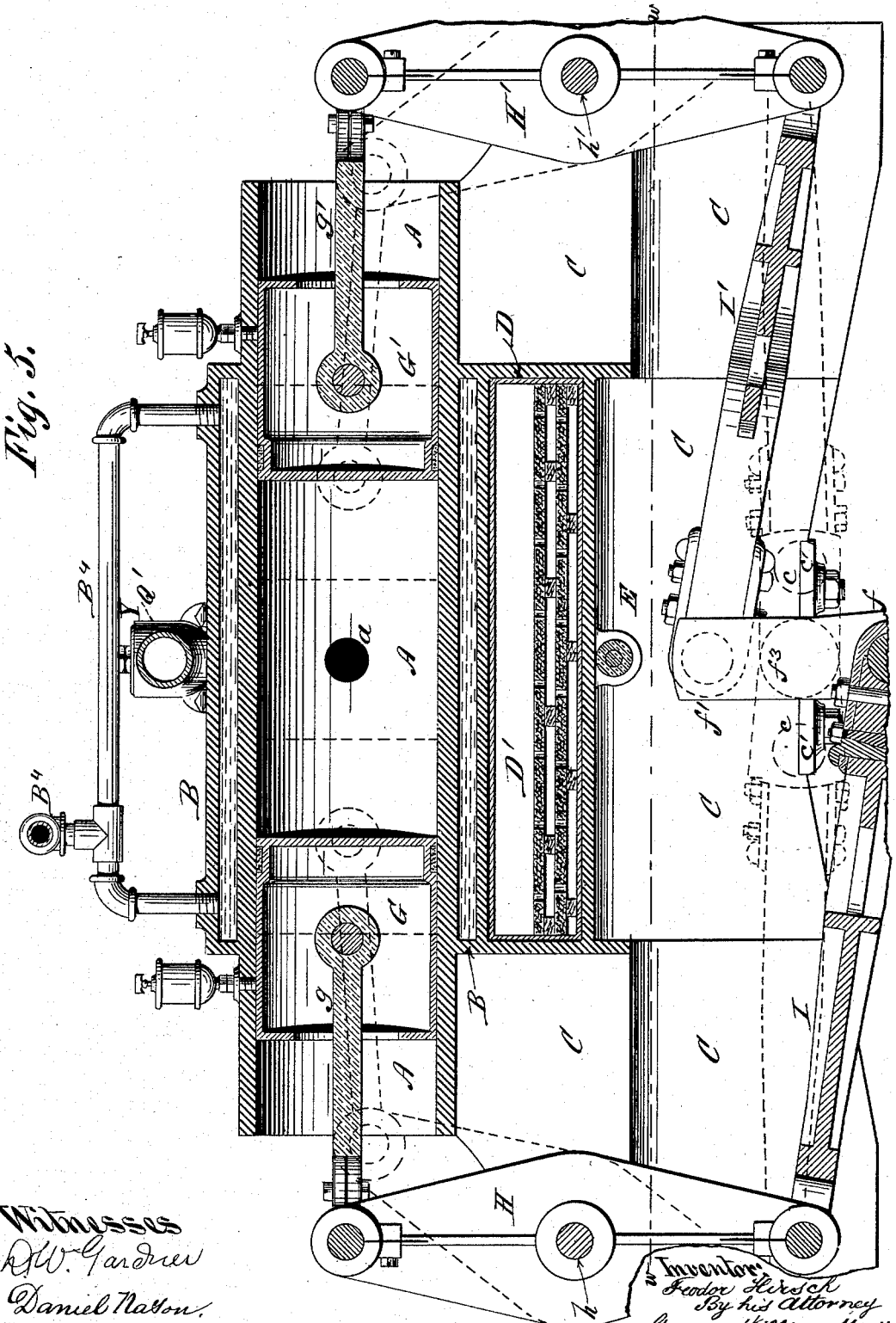
Figure 6:
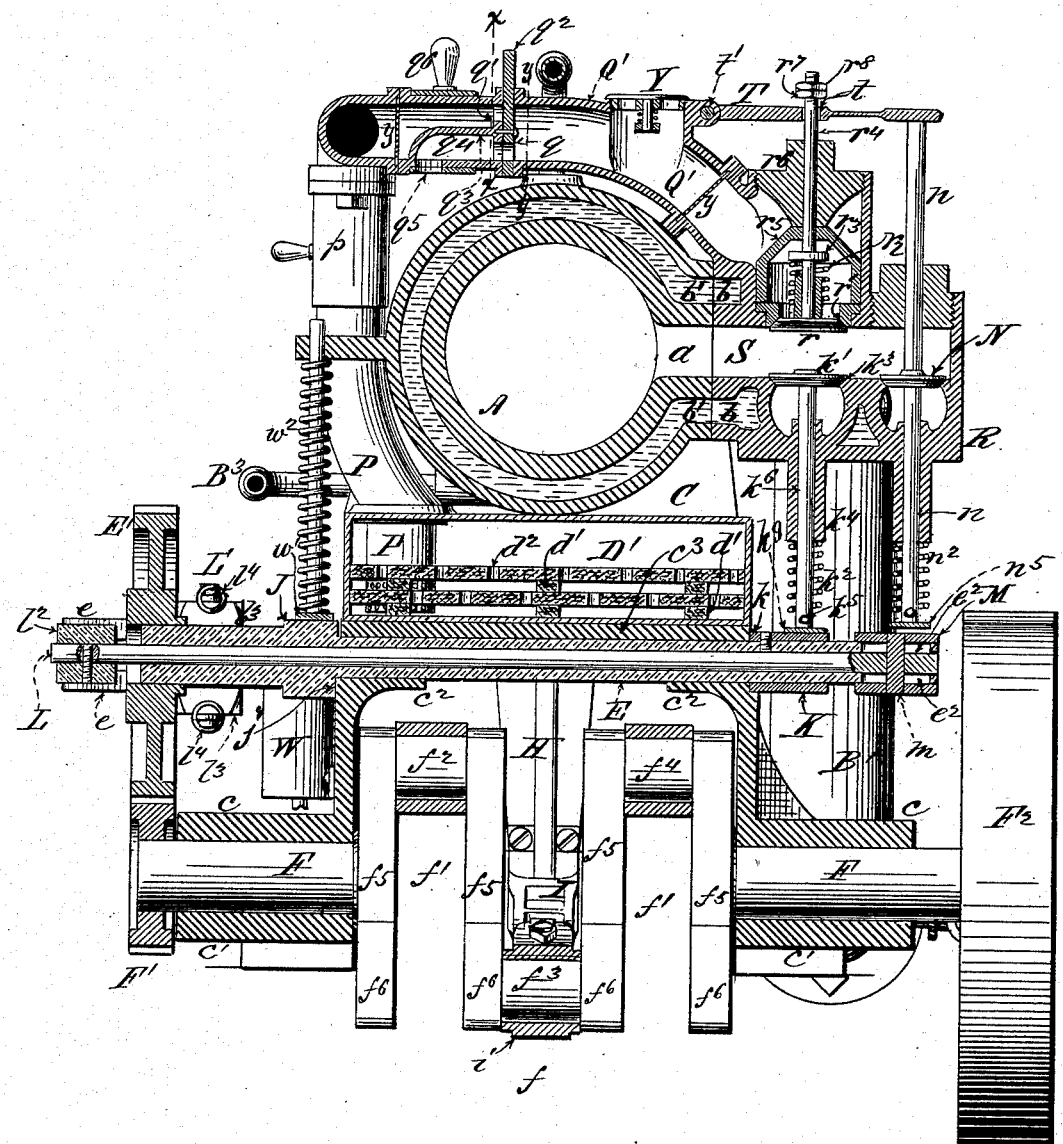
Figure 7:
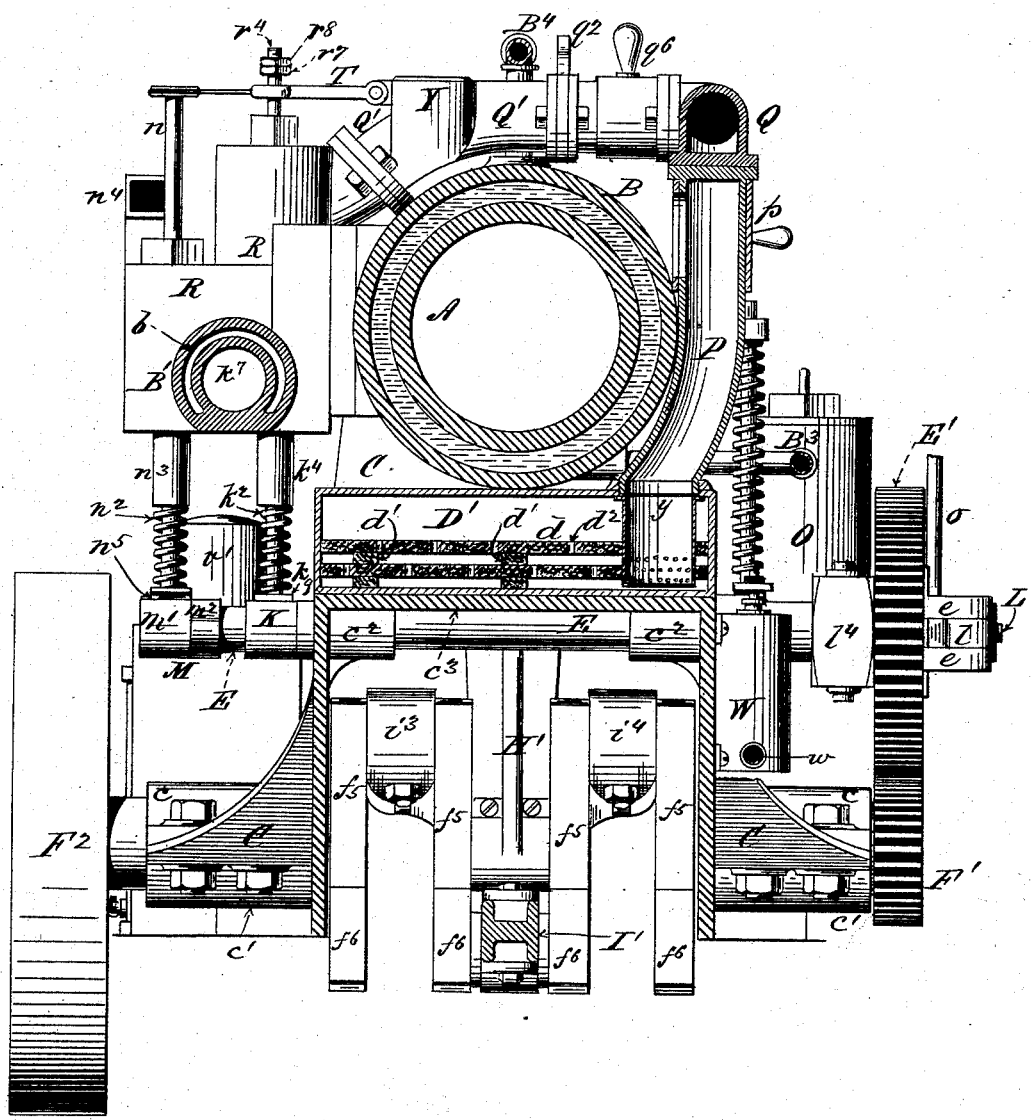
Figure 25:
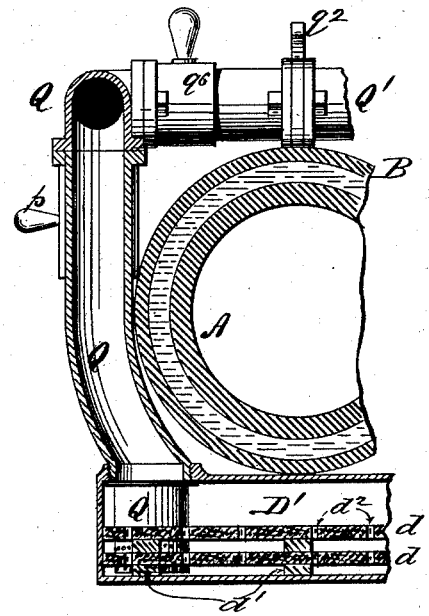
Figure 27:
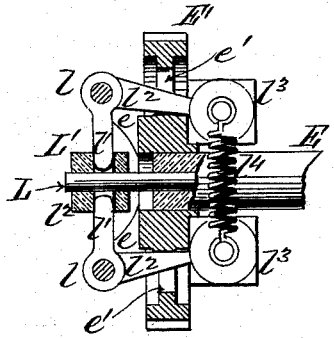
Figure 26:
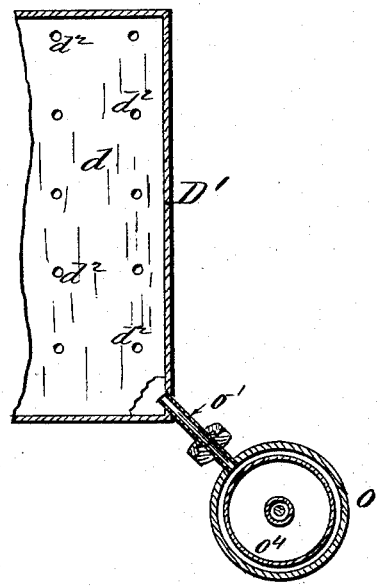

Figure 1, is a plan of my improved gas engine. Fig. 2, is a front elevation of the same; Fig. 3, an elevation taken from the left end of the engine; Fig. 4, an elevation of the rear of the engine partially in section; Fig. 5, a central vertical longitudinal section; Fig. 6, a central vertical section on line $u$, $u$, Fig. 1. Fig. 7, is a transverse section upon plane of line $v$, $v$, Fig. 1. Fig. 8, is a horizontal section through the rocking levers, upon plane of line $w$, $w$, Fig. 5, showing the pitmen and cranks in elevation. Fig. 9, is an end elevation of the crank shaft. Fig. 10, is a sectional elevation of a portion of the rear of the engine, showing the hydro-carbon feeder and the air pump. Fig. 11, is an elevation of the mixer valve disk; Fig. 12, an elevation of the end of the mixer tube, showing the valve openings; Fig. 13, a section upon plane of line $x$, $x$, Fig. 6, looking toward the mixer valve disk. Fig. 14, is a similar view upon plane of line $y$, $y$, Fig. 6. Fig. 15, is a sectional view of the lower portion of the hydro-carbon feeder; Fig. 16, a transverse section of the relief cam M, on the rear of the cam shaft. Fig. 17, is a vertical section of the valve chest upon plane of line 1, 1, Fig. 18, showing the igniter and the gas and exhaust valves. Fig. 17½, is a transverse section upon plane of line 5, 5, Figs. 17 and 18; Fig. 18, a side view of the valve chest; Fig. 19, a vertical section of the valve chest upon plane of line 2, 2, Fig. 18, showing governor air relief valve and conduit. Fig. 20, is a horizontal section of the valve chest upon plane of line 3, 3, Figs. 17 and 18. Fig. 21, is an elevation of the inner face of the valve chest, removed from the power cylinder. Fig. 22, is a top view of the bushing used in holding the gas valve seat in position; Fig. 23, a transverse section upon plane of line 4, 4, Fig. 17, showing the ports through which the igniter is heated before starting the engine. Fig. 24, is an end view of the igniter casing. Fig. 25, is a vertical sectional view through a portion of the power cylinder and the carburetor and its eduction pipe. Fig. 26, is a horizontal section of a portion of the carburetor and the hydro-carbon feeder. Fig. 27, is a sectional elevation of the governor.

The cylinder A, water jacket B, and frame work C, are preferably all cast in one piece,—a recess D, being formed in the frame below the cylinder and water jacket and above the cam shaft E, for the reception of the carbureter D', when used in lieu of any other source of gas supply.

The cam shaft E, and the power or crank shaft F, are situated transversely to the power cylinder A, their axes being in the same vertical plane, midway between the ends of the said cylinder.

The trunk pistons G, G', are connected by their rods $g$, $g'$, to the upper ends of the rock levers H, H', mounted upon rock shafts $h$, $h'$, the opposite ends of the said rock levers H, H', being connected by the pitmen I, I', to the cranks $f$, $f'$, respectively.

By reference to Figs. 6 and 8, it will be seen that the cranks $f$, $f'$, are double cranks, the wrist pins $f^2, f^3, f^4$, each being supported by two webs $f^5$. The wrist pin $f^3$, is arranged centrally between the two inner webs $f^5$, and is clasped by the stirrup $i$, of the straight pitman I, pivotally connected to the lower end of the left hand rocking lever H. The other pitman I', in like manner pivotally connected to the right hand rocking lever H', is bifurcated at its inner extremity, being formed with the stirrup arms $I^2, I^2$, which extend back a sufficient distance to enable the pitman I' to straddle the middle crank $f'$,—the space $i'$, between the arms $I^2$, $I^2$, and the web $i^2$ being sufficient to admit of the passage of the said crank $f$, when both the pitmen I, I', have reached the full extent of their inward stroke caused by the outward stroke or separation of the trunk pistons G, G'. The stirrups $i^3$, $i^4$, at the ends of the arms $I^2$, $I^2$, clasp the wrists $f^2$, $f^4$, respectively, so that the outer cranks $f'$, $f'$, act virtually as one crank, opposed to the central crank $f$. It is to be noted however that the axes of the wrists $f^2$, $f^3$, $f^4$, are all in the same plane and that they are equi-distant from the axis of the two sections of the crank or power shaft F, so that they naturally balance each other in all positions. To compensate for the difference in weight between the two pitmen I, I', the webs $f^5$, are widened or thickened, or otherwise increased in weight at their extensions $f^6, f^6$, (see Fig. 9) beyond the crank shaft F, upon the side upon which the wrist $f^3$ is situated thereby counterweighting the arms $I^2, I^2$, and the duplex cranks $f, f'$.

The crank shaft F, is secured in the lateral bearings $c$, $c$, formed in the frame C, by caps $c'$, $c'$. At its front end it is provided with a pinion F', while its rear end carries the balance wheel $F^2$. The pinion F', meshes with the spur gear E', upon the front end of the cam shaft E. The gear E', is twice the diameter of the pinion F', and consequently two revolutions of the power or crank shaft F, are necessary to effect one revolution of the cam shaft. The latter rotates in bearings $c^2$, $c^2$, formed in the frame C, being held against longitudinal movement by the shoulder $j$, of the pumping cam J, in front, and by the shoulder $k$, of the exhaust cam K, at the rear, or by other suitable means.

The cam shaft E, is made hollow to receive the governor rod L, which is free to slide therein longitudinally under the action of the governor L', attached to the spur wheel E'. Arms or brackets $e$, $e$, project outward from the face of the spur wheel E', to which are pivotally connected the bell crank levers $l$, $l$. The outer or shorter arms $l'$, $l'$, of these crank levers engage with the head or socket piece $l^2$, which is secured rigidly to the governor rod L. The longer inner arms $l^2, l^2$, of the crank levers $l$, $l$, project backward through slots $e'$, $e'$, in the gear E', and carry the centrifugal weights $l^3, l^3$, which are connected by the springs $l^4$, $l^4$, which tend constantly to draw the said weights inward toward each other and hold them in their normal position in which position the head $l^2$, and rod L, are drawn forward. The relief valve cam M is situated loosely upon the rear end of the shaft E, being secured rigidly to the cam rod L, by a stud or cross bar $m$, passing through the longitudinal slots $e^2, e^2$, formed in the shaft E. The relief cam M, consists of a concentric hub or sleeve $m'$, formed with an eccentric portion or cam surface $m^2$. When the governor L', is at rest and the parts in their normal positions as shown in the drawings, the governor rod L, holds the concentric portion $m'$, of the relief cam M, under the valve rod $n$, of the relief valve N. When the speed of the engine causes the weights $l^3$, $l^3$, to separate against the tension of the springs $l^4$, $l^4$, thereby acting through the crank levers $l$, $l$, and head $l^2$, to move the governor rod L, inward, the eccentric portion $m^2$, of the cam M, is brought under the valve rod $n$, of the relief valve N, so that the valve will be raised from its seat at every revolution of the cam shaft until the eccentric portion $m^2$, of the cam is withdrawn, and the concentric portion $m'$, again comes under the valve rod.

The carburetor D', consists of an oblong box or compartment resting upon a shelf or table $c^3$, formed in the frame C, for its support beneath the cylinder A, and water jacket B. A suitable amount of absorbent material is arranged within the compartment D', in such manner as to present the hydro-carbon for admixture with the air passed through it. As shown in the drawings this absorbent material consists of two or more sheets or layers of felt or similar material $d$, held apart by blocks $d'$, of the same material and formed with perforations $d^2$, for the passage of air and vapor.

The hydro-carbon is supplied to the carburetor D', through an automatic feeder O, interposed between the supply pipe $o$, which proceeds from the reservoir or other source of supply, and the inlet pipe $o'$, (see Fig. 26). The feeder O, consists of a vessel formed with a valve chamber $o^2$, into which the supply pipe enters. The valve $o^3$, is connected to a float $o^4$, arranged to close the valve $o^3$, when the liquid hydro-carbon attains a certain height in the feeder O. This height corresponds to the level at which it is designed to maintain the hydro-carbon liquid in the carburetor.

Air is admitted to the carburetor D', through the pipe P, provided with the damper or regulator $p$. By reference to Fig. 7, it will be seen that the pipe P, is closed above the damper $p$, although it acts as a support for the upper portion of the vapor conduit Q. It will also be seen that it is extended down into the carburetor below the absorbent material so as to insure the passage of the air through and around the latter. The vapor conduit Q, through which the air charged with the hydrocarbon vapor leaves the carburetor is connected with the transverse conduit Q', which extends over the working cylinder and opens into the valve chest R, upon the opposite side of the cylinder. A combined throttling and mixing valve is interposed in the transverse conduit Q'. This consists of a valve disk $q$, which is rotatable upon a diaphragm $q'$, extending across the section of the conduit Q', the diaphragm and the rotatable valve disk being formed with ports which may be brought into coincidence or closed by means of the handle $q^2$. The conduit Q', is divided by a partition $q^3$, in front of the valve seat or diaphragm $q'$, (see Figs. 6 and 13) forming an air passage $q^4$, into which air is admitted through the opening $q^5$, controlled by the sleeve damper $q^6$. The lower quadrantal port $q^7$, in the diaphragm $q'$, opens into this air passage $q^4$, while the other upper quadrantal port $q^8$, opens into the vapor or gas channel. The throttling disk $q$, is formed with a semi-circular port $q^9$, so that by rotating the disk $q$, more or less to the right or left the relative areas of the ports $q^7$, $q^8$, may be varied to regulate the degree to which the gas is diluted by fresh air prior to its being drawn into the power cylinder A.

The conduit Q', enters the valve chest R, above the inlet or feed valve $r$, which opens inward into the valve chamber S, the latter coinciding with, and forming a continuation of, the cylinder port $a$, situated midway of the length of the cylinder. The feed valve $r$, tends constantly to close against its seat $r'$, by reason of the spring $r^2$, bearing against the collar $r^3$, upon the valve stem $r^4$, which latter extends upward through the bushing $r^5$, and cap $r^6$, to and through a perforation $t$, in the lever T, and is provided with jam nuts $r^7$, $r^8$, which perform the function of an adjustable shoulder above the said lever T. In the same axial line with the feed valve $r$, is the exhaust valve $k'$, opening upward into the valve chamber S, against the resistance of the spiral spring $k^2$, which tends constantly to hold it down against its seat $k^3$, by reason of its bearing against the lower end of the sleeve $k^4$, and its engagement with the eye $k^5$, at the lower end of the valve stem $k^6$. The exit valve $k'$, controls the entrance to the exhaust passage $k^7$, which opens into the exhaust pipe $k^8$. The relief valve N, is in like manner held normally against its seat $n'$, by a spiral spring $n^2$, attached to the lower end of its valve stem $n$, and bearing against lower end of the sleeve $n^3$. Its stem $n$, extends upward through the valve chamber S, and cap $s$, to the lever T, the outer end of which rests upon it. The relief valve controls the entrance to the air conduit $n^4$, the other extremity of which opens into the atmosphere. Flat springs $k^9$, and $n^5$, are interposed between the lower ends of the valve stems $k^6$, and $n$, and the cams K, and M, to protect the surfaces of the latter against undue wear.

The ignition chamber U, opens into the valve chamber at right angles and in line with the feed and exhaust valves $r$, and $k'$. The igniter V, is preferably of the form described in my application for patent filed May 1, 1893, Serial No. 472,494, although any other form of igniter may be substituted. As shown in the accompanying drawings V, represents the platinum igniting cap padded with loose or spongy material as set forth in said prior application.

The igniting cap is fed with hydro-carbon vapor under pressure through pipe $v$, which extends to the carbureting chamber $v'$. Air is pumped into the carbureting chamber $v'$, through the pipe $v^2$. This pipe $v^2$, is connected by pipe $v^3$, with an accumulator $v^4$, consisting of an accordion bellows provided with a weight $v^5$, or other well known means for effecting a similar result. The air is supplied to the igniter V, during the operation of the engine by an air pump W, connected by pipe $w$, with the pipe $v^2$, running to the carbureting chamber $v'$, the accumulator $v^4$, tending to equalize the pressure. The pump W, is preferably operated by a cam J, upon the cam shaft E, said cam actuating a spring lever $w'$, against the resistance of a coiled spring $w^2$.

When the engine stops temporarily it is desirable to maintain the supply of hydrocarbon to the igniter under pressure in order to maintain the platinum in an incandescent state, and this the accumulator will do for several minutes; but should a longer delay occur the auxiliary hand pump X, provided for such an emergency, is utilized in supplying the accumulator $v^4$, with air. A check valve $x'$, is interposed in the pipe $x$, between the hand pump X, and the accumulator $v^4$, so as to cut off the hand pump from the accumulator when the engine is in operation and the pump W performing its function.

A water jacket B', surrounds the exhaust pipe $k^8$, and communicates with the water jacket B, surrounding the power cylinder A, through the medium of the valve chest R. By reference to Fig. 18, it will be seen that the exhaust passage $k^7$, is partially surrounded by a water space $b$, which coincides with the interior of the water jacket B'. This water space $b$, extends around the valve chamber S, as will be understood by reference to Figs. 17 to 21, inclusive, in which figures are shown the water spaces which coincide and form continuations of the openings $b'$, $b'$, into the water jacket B, as shown in Fig. 6. One branch $B^2$, of the water supply pipe enters the lower end of the exhaust pipe jacket B', while the other $B^3$, connects with the water jacket B, at two points below the power cylinder A. The exit pipes $B^4$, lead from the water jacket B, above the power cylinder; so that it will be seen that a complete circulation is insured,—the water supplied to the exhaust pipe jacket B', having to pass through the valve chest R to the water jacket B, surrounding the power cylinder and the water supplied to the said jacket B, having to pass around the cylinder A, before it can make its exit.

The operation of the engine is as follows: Presuming that a charge of mingled gas and air has just been fired, the pistons G, G', recede from each other imparting the energy to the power shaft F, and fly wheel $F^2$, through the medium of the rods $g$, $g'$, rockers H, H', pitmen I, I', and cranks $f$, $f'$. As the pistons G, G', start back toward each other the cam K, raises the exhaust valve $k'$, from its seat and by the time the pistons have reached the limit of their inward stroke most of the products of combustion have been expelled and the cam K, allows the exhaust valve $k'$ to close. As the pistons again recede they create a partial vacuum between them drawing in a fresh charge of mingled vapor through the valve $r$, against the resistance of the spring $r^2$. The pistons having reached the outward limit of their stroke, and having thereby drawn in a considerable body of gas and air, now compress the charge to about one third of its volume during their approach, thereby forcing a portion of the charge back through the valve chamber S, into contact with the incandescent torch V, and igniting the charge, when the same cycle is repeated. It will thus be noted that up to a prescribed rate of speed a charge is fired at every second revolution of the power shaft, the cam shaft, as before set forth making only one revolution to two of the power shaft. Should however the speed of the engine increase beyond a prescribed degree the governor L', will throw the cam M, into action, so that the relief valve N, will be opened and at the same time the supply valve $r$, will be positively held closed by reason of the raising of the outer end of the lever T, (pivoted at $t'$) by the valve stem $n$, of the relief valve N. The result of this is that air alone is admitted to the cylinder until the speed of the engine lessens sufficiently to allow the governor to retract the cam M, when the relief valve N, closes automatically, releasing the lever T, and permitting the supply valve again to yield against the resistance of its spring $r^2$, under a partial vacuum in the cylinder A.

In order to guard against possible back pressure or flame through a failure of the supply valve $r$, to close for any reason, I provide the supply conduit Q', with a safety valve Y, adjusted to open under an excess of internal pressure; and also with gauze screens $y$, $y$, interposed in the passage.

I am aware that in Patent No. 393,037, of November 20, 1888, a duplex steam cylinder with closed ends, having both central and end ports, and opposed steam pistons having rigidly connected piston rods, is shown as connected by links, rock shafts and pitmen to opposed cranks upon a common power shaft, but that arrangement could not be used as a gas engine, neither is it the equivalent of my improved gas motor in which the single central port acts for both the charge and discharge of the gas and the product of combustion, the open ends of the cylinder allowing the pressure of the atmosphere to effect the return stroke, and the connection between the trunk-pistons and the ends of the rock levers being effected without links by rigid rods pivotally secured to the trunk pistons.

I do not seek to cover broadly a motor having its operative parts arranged substantially in the same plane of action; I do claim however that I am the first to produce a perfectly balanced gas engine in which noise and vibration are reduced to the minimum, and this I effect by the special construction and arrangement of parts herein shown and described.

What I claim as my invention, and desire to secure by Letters Patent, is—

1. In a gas engine, the combination of an open-ended power cylinder formed with a single central inlet and discharge port; two trunk pistons in said cylinder; two rigid piston rods respectively pivotally connected at their inner ends to said trunk pistons, and at their outer ends to rocking levers; said rocking levers consisting of arms projecting radially upon opposite sides of the fixed shafts or fulcrums on which they are mounted; two pitmen pivotally connected at their outer ends to the other ends of said rocking levers and at their inner ends to radially opposed cranks upon a common power shaft; and said power shaft formed with said radially opposed cranks having their common central plane of action coincident with that of the common central longitudinal plane of the cylinder, trunk-pistons, piston rods, rocking-levers, and pitmen, for the purpose and substantially in the manner set forth.

2. In a gas engine the combination of a power cylinder formed with a gas port, two pistons contained therein, two piston rods connecting said pistons with two rocking levers, said rocking levers supported upon fixed rock-shafts or fulcrums, a pitman connecting one rocking lever to a central double crank upon the power shaft, a bifurcated pitman connecting the other rocking lever to two double cranks on the power shaft, and said power shaft formed with three double cranks, the central one opposed to the other two for the purpose described.

3. In a gas engine the combination of a power cylinder formed with a gas port, two pistons contained therein, two piston rods connecting the said pistons with two rocking levers, said rocking levers supported upon fixed rock-shafts or fulcrums, a pitman connecting one rocking lever to a central double crank upon the power shaft, a bifurcated pitman connecting the other rocking lever to two double cranks on the power shaft, and said power shaft formed with three double cranks the central one opposed to the other two, and the webs of the cranks upon that side of the shaft being enlarged to counter-balance the weight of the two cranks and the bifurcated pitman upon the other side of the power shaft, substantially as described.

4. In a gas engine the combination of a power cylinder formed with a gas port, two pistons contained therein, two piston rods connecting the said pistons with two rocking levers, said rocking levers supported upon fixed rock shafts or fulcrums, two pitmen connecting said rocking levers with separate cranks upon a common power shaft, said power shaft formed with two opposed cranks, a hollow cam shaft geared to the said power shaft, a centrifugal governor supported upon the cam shaft, a sliding governor-rod resting in said hollow cam shaft and carrying a cam arranged to lift a relief valve from its seat when the speed of the engine exceeds a prescribed degree, and said relief valve interposed between the valve chamber of the engine and the exterior atmosphere, for the purpose described.

5. In a gas engine the combination of a power cylinder formed with a gas port, two pistons contained therein, two piston rods connecting the said pistons with two rocking levers, said rocking levers supported upon fixed rock shafts or fulcrums, two pitmen connecting said rocking levers with separate cranks upon a common power shaft, said power shaft formed with two opposed cranks, a hollow crank shaft geared to the said power shaft, a centrifugal governor supported upon the said hollow cam shaft, a sliding governor rod resting in said hollow cam shaft, a cam secured to said governor rod and arranged to lift a relief valve from its seat when the speed of the engine exceeds a prescribed degree, said relief valve interposed between the valve chamber of the engine and the exterior atmosphere, mechanism actuated by said relief valve when raised to hold the supply valve positively closed, and said supply valve interposed between the supply conduit and the valve chamber of the engine.

6. In a gas engine the combination of a power cylinder formed with a gas port, two pistons contained therein, two piston rods connecting the said pistons with two rocking levers, said rocking levers supported upon fixed rock shafts or fulcrums, two pitmen connecting said rocking levers with separate cranks upon a common power shaft, said power shaft formed with two opposed cranks, a hollow crank shaft geared to the said power shaft, a centrifugal governor supported upon the said hollow cam shaft, a sliding governor rod resting in said hollow cam shaft, a cam secured to said governor rod and arranged to lift a relief valve from its seat when the speed of the engine exceeds a prescribed degree, said relief valve interposed between the valve chamber of the engine and the exterior atmosphere and formed with an extension of the valve stem which engages with the outer end of a pivoted lever, said pivoted lever engaging with the valve stem of the supply valve, and said supply valve interposed between the supply conduit and the valve chamber of the engine, the parts being so arranged that when the relief valve is raised the supply valve will be held closed by the pivoted lever, substantially as described.

FEODOR HIRSCH.

Witnesses:
GEORGE WILLIAM MIATT,
D. W. GARDNER.